United States Patent [19]

Otto et al.

[11] Patent Number: 4,517,491
[45] Date of Patent: May 14, 1985

[54] INCANDESCENT LAMP SOURCE UTILIZING AN INTEGRAL CYLINDRICAL TRANSPARENT HEAT MIRROR

[75] Inventors: Lee W. Otto, Pepper Pike; John H. Ingold; Rolf S. Bergman, both of Cleveland Heights, all of Ohio

[73] Assignee: General Electric Company, Schenectady, N.Y.

[21] Appl. No.: 519,163

[22] Filed: Aug. 1, 1983

[51] Int. Cl.³ .............................................. H01K 1/34
[52] U.S. Cl. .................................... 313/579; 313/580; 313/573; 313/634
[58] Field of Search ............... 313/578, 579, 580, 255, 313/258, 573, 635, 634

[56] References Cited

U.S. PATENT DOCUMENTS

| | | | |
|---|---|---|---|
| 3,250,934 | 5/1966 | Peterson | 313/634 X |
| 3,624,444 | 11/1971 | Berthold et al. | 313/635 X |
| 4,017,758 | 4/1977 | Almer et al. | 313/580 X |

Primary Examiner—Arthur Kellogg
Attorney, Agent, or Firm—J. P. McMahon; Philip L. Schlamp; Fred Jacob

[57] ABSTRACT

An improved incandescent lamp comprising an inner envelope disposed within an outer envelope is disclosed. The inner envelope contains a halogen gas along with a relatively high pressure efficient fill gas. The inner envelope houses a tungsten filament which is partly surrounded by a separate light-transmissive cylinder. The separate cylinder has on one of its surfaces a selective infrared reflective filter capable of efficiently operating at a temperature range of up to and including about 950° to about 1050° C.

5 Claims, 6 Drawing Figures

INCANDESCENT LAMP SOURCE UTILIZING AN INTEGRAL CYLINDRICAL TRANSPARENT HEAT MIRROR

CROSS REFERENCE TO RELATED APPLICATIONS

U.S. patent application Ser. Nos. 519,165, 519,164, and 519,162 filed concurrently herewith, respectively for "General Service Incandescent Lamp with Improved Efficiency" of I. Berlec, "Improved Incandescent Lamp" of C. Tschetter et al, and "Higher Efficiency Incandescent Lighting Units" of Brinn et al, all assigned to the same assignee as the present invention, are all related to the present invention.

BACKGROUND OF THE INVENTION

This invention is related to an incandescent lamp, and more particularly, to an improved high efficiency incandescent lamp comprising an outer bulb filled with an inert gas or evacuated and an inner envelope containing a halogen atmosphere along with a relatively high pressure fill gas. The inner envelope further houses a separate light-transmissive cylinder having on one of its surfaces a selective infrared reflective film at least partly surrounding a tungsten filament disposed within the cylinder in the inner envelope.

The continuing pursuit of improving the efficiency of lamps is of increasing importance due to the increasing cost of energy. One of the family of lamps in which the efficiency is desired to be improved is the incandescent lamp. Incandescent lamps, although having efficiency ratings lower than those of fluorescent and high intensity discharge lamps, have many attractive features, such as, low cost, compact size, instant light, dimmability, convenience, pleasing spectral distribution, and millions of existing sockets in the homes of users who have become accustomed to the pleasing incandescent type lighting.

Incandescent lamps come in various sizes, the most well-known being that of the A-line which is typically termed a general service incandescent lamp and is available in a wide range of wattage ratings. Such general service incandescent lamps typically employ a tungsten filament. Another incandescent lamp employing a tungsten filament is a Parabolic Aluminized Reflector (PAR) having a built-in reflector for accurate focusing of emitted light to a desired medium.

In typical operation of the general service and PAR incandescent lamps over an extended period of time, some tungsten from the filament evaporates and becomes deposited on the envelope wall, which, in turn, typically causes a darkening of the envelope, which, in turn, decreases the lumen output of the lamps, which, in turn, reduces the lumens per watt or efficacy of the lamps. It is known that the darkening of the envelope caused by the tungsten type filament may be substantially reduced by providing a halogen doped gas atmosphere surrounding the tungsten filament which provides a regenerative (transport) cycle that keeps the envelope wall clean resulting in improved efficacy.

The use of a halogen gas adapted to the relatively inexpensive general service incandescent lamp is described in the previously mentioned U.S. application Ser. No. 519,165, and assigned to the same assignee as the present invention. The halogen atmosphere of the aforementioned U.S. application Ser. No. 519,165 is considered desirable for the present invention along with additional improvements afforded by this invention and related to the general service and PAR incandescent lamps.

The performance of a tungsten filament of the incandescent lamp can be further improved by housing the filament in a suitable fill-gas, such as xenon, krypton or argon, raised to a pressure significantly above atmospheric. The high pressure fill-gas improves the performance of the lamp by reducing the evaporation rate of the tungsten from the filament, thereby increasing the life of the filament when operated at the same temperature. Alternatively, the reduced evaporated rate of tungsten from the filament permits one to raise the filament operating temperature while maintaining the same life. Operating the filament at higher temperatures increases lumens and efficacy.

The arc-out resistance of the filament, that is, the resistance of the filament to being burned out by an arcing condition within its housing, may be improved by the addition of nitrogen. The aforementioned U.S. patent application Ser. No. 519,165 discloses an incandescent lamp utilizing the efficacy gain realized by the high pressure fill-gas of the xenon, krypton or argon, and to improve the arc-out resistance of the filament by the addition of the nitrogen gas. It is considered desirable to operate the tungsten filament within the relatively high pressure fill-gas having nitrogen additive along with further improvements of the present invention.

Another means for extending the life of an incandescent lamp is to reduce the operating voltage of the filament, but it is desired that this reduction of operating voltage be accomplished while maintaining the wattage and efficacy of the lamp. The U.S. patent application Ser. No. 519,165 discloses a specially suited filament that provides extended life and maintains the wattage of the lamp. Alternatively, the efficacy of a low voltage incandescent filament can be increased while maintaining life. Further still, a low voltage filament, such as described in U.S. patent application Ser. No. 519,165, is advantageous in that the low voltage filament is mechanically sturdy with a stable configuration. It is considered desirable to provide a specially suited filament along with further improvement of this invention for a general service incandescent lamp.

Incandescent lamps may also be improved by utilizing an infrared type film. Incandescent lamps employing infrared films are well known. One such incandescent lamp is disclosed in United Kingdom (UK) Patent Specification No. 834,087, published May 4, 1960. The UK Patent Specification No. 834,087 discloses an electric incandescent-filament lamp wherein the filament is at least partially surrounded by a multilayer interference filter which is highly transparent to visible light, but is also highly reflective to infrared radiation. U.K. Specification No. 834,087 discloses one embodiment of filter formed on the surface of a light-transmitting support mounted within the lamp envelope. Although the UK Patent Specification No. 834,087 discloses an infrared film formed on a mounted member within the incandescent lamp, it is considered desired, and a feature of the present invention to provide the incandescent lamp art with an improved incandescent lamp having an infrared film with improved characteristics and disposed on a support member within the incandescent lamp which is arranged in such a manner so as to improve the efficacy of the incandescent lamp.

Accordingly, an object of the present invention is to provide the incandescent art with improved general service and PAR incandescent lamps having (1) a halogen gas atmosphere for efficacy improvements and (2) an inner member with an infrared film so as to further enhance the efficacy of the incandescent lamp.

Other objects of the present invention are to provide the halogen gas atmosphere and the inner member having the infared film in such a manner so as to maintain the relatively inexpensive cost of both the general service and PAR incandescent lamps.

These and other objects of the present invention will become apparent upon consideration of the following description taken in conjunction with the accompanying drawings.

SUMMARY OF THE INVENTION

The present invention is directed to improved incandescent lamps having an outer envelope in which is disposed an inner envelope which has enclosed therein a light-transmissive cylinder having an infrared selective film for improving the efficacy of the lamp.

In accordance with one embodiment of the invention, an efficacy improved incandescent lamp is provided. The improved incandescent lamp comprises an outer envelope containing an inner envelope spatially disposed in a coaxial manner therein. The inner envelope houses a tungsten filament spatially disposed therein in a coaxial manner. The inner envelope contains a halogen gas along with a relatively high pressure fill-gas. Further, the inner envelope houses a light-transmissive cylindrical member disposed within the envelope so as to at least partially surround the tungsten filament. The cylindrical member is provided with an infrared film covering one or both of its surfaces. The infrared film is effective during energization of the filament to intercept and reflect back toward the filament a major portion of the infrared radiation emitted by the energized filament. The infrared film is capable of withstanding and operating effectively at the operating temperature and in the halogen atmospheric environment of the film substrate.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

DETAILED DESCRIPTION OF PREFERRED EMBODIMENTS

Figures 1, 2:
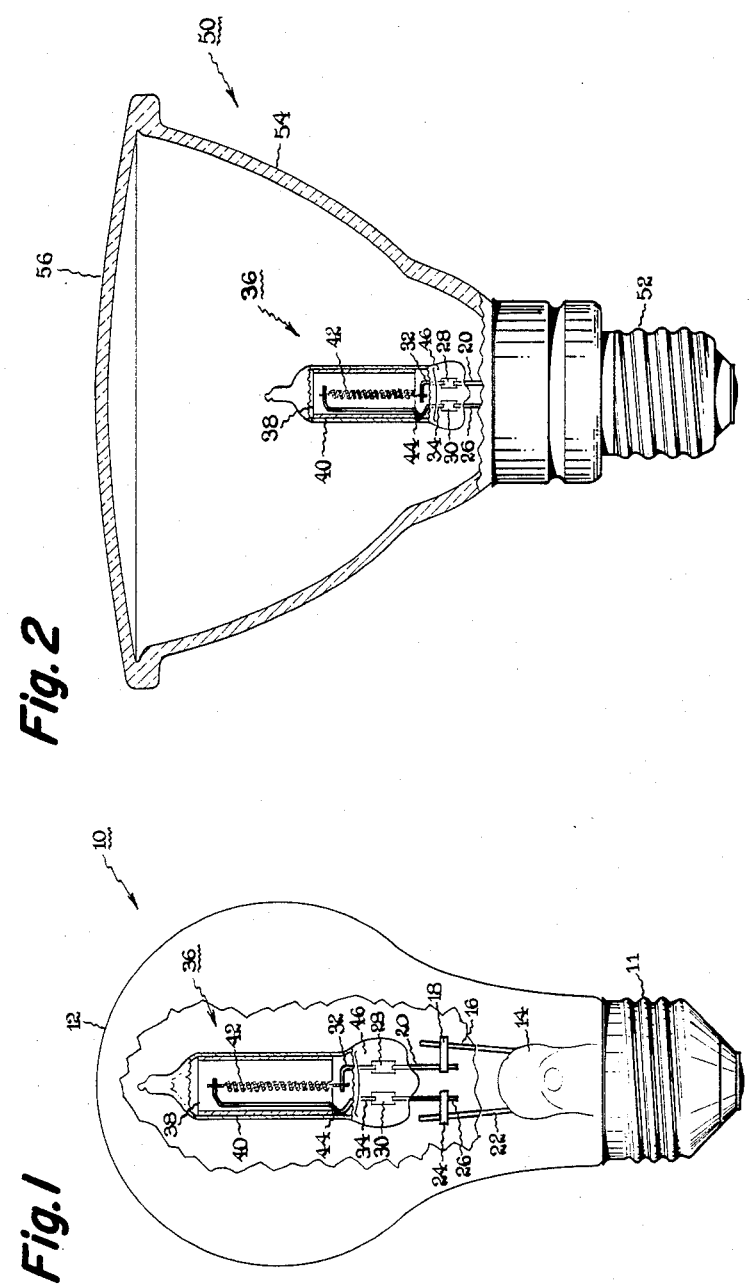
FIG. 1 shows an improved incandescent lamp in accordance with one embodiment of the present invention.
FIG. 2 shows an improved PAR incandescent lamp in accordance with another embodiment of the present invention.

FIG. 1 shows an incandescent lamp 10 having an outer envelope 12 sealed to an electrically conductive base 11. The outer envelope 12 has spatially disposed in a coaxial manner a single-ended generally cylindrical inner envelope 36. Although FIG. 1 shows a single-ended inner envelope 36, the practice of this invention contemplates either a single-ended or double-ended inner envelope 36. The inner envelope 36 has a pair of inleads 20 and 26 which are rigidly affixed to a stem 14. The inlead 20 is affixed to the stem 14 by a cross-member conductor 18 having one end connected to inlead 20 and the other end connected to conductor 16 which extends through stem 14 and is connected to the appropriate portion of the electrically conductive base 11. The inlead 26 is affixed to stem 14 by a cross-member conductor 24 having one end connected to inlead 26 and the other end connected to conductor 22 which extends through stem 14 and is connected to the appropriate portion of the electrically conductive base 11. The inner envelope 36 of the present invention shown within the general service incandescent lamp 10 of FIG. 1 is also applicable to another embodiment shown in FIG. 2 within a PAR lamp 50.

The PAR lamp 50 of FIG. 2 having a generally frustoconical side portion 54 and a relatively flat top lens portion 56 is shown in a partially exposed manner so as to illustrate the location of the inner envelope 36 therein.

The inner envelope 36 is centrally positioned adjacent the base of the PAR lamp 50 and the inleads 20 and 26 are electrically connected (not shown) to the electrically conductive base 52 thereof. The filament 42 within the inner envelope 36 is located within lamp 50 so as to be predeterminedly aligned in a longitudinal manner relative to the focal point of the parabolic lamp 50. More particularly, the midsection of the filament 42 is aligned in a longitudinal manner to within ±7.5 mm of the focal point of lamp 50. This alignment provides, in part, the desired optical light transmission characteristics of lamp 50. Still further with regard to filament 42, it is advantageous from an optical viewpoint to have the length of the filament held to a relatively small value so that it acts as a point source for emitting the incandesent light of the lamp 50.

Figure 3:
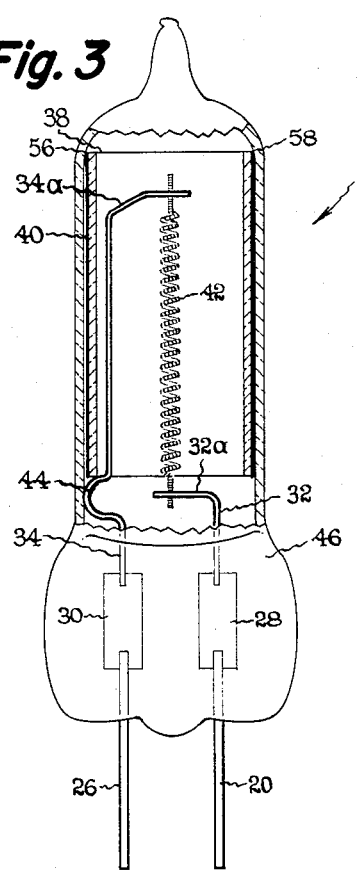
FIG. 3 shows the inner envelope of the incandescent lamps of FIGS. 1 and 2 in accordance with one embodiment thereof.

The inner envelope 36 shown in FIG. 2 and also in FIG. 1 comprises a plurality of elements 20, 26, 28, 30, 32, 34, 38, 40, 42, 44, and 46 which are shown more clearly in FIG. 3. FIG. 3 shows one embodiment of the present inner envelope 36 primarily related to one arrangement of a light-transmissive cylinder member 38 centrally disposed about and coaxially aligned with a filament 42 within the inner envelope 36. FIG. 3 shows the inleads 20 and 26 respectively connected to molybdenum foils 30 and 28 encapsulated within a pinch weld 46 of the inner envelope 36. The molybdenum foils 30 and 28 are respectively connected to conductors 32 and 34. The molybdenum foils 30 and 28 have a flat-like structure and are commonly utilized to provide for proper sealing within pinch weld 46 when a quartz tube is used to form the inner envelope 36. However, if a glass-like tube is used to form inner envelope 36 the inlead 20 and 26 may each be rod-like for entrance into inner envelope 36 obviating the need for the molybdenum foils 28 and 30 and also the conductors 32 and 34. For the embodiment shown in FIG. 3, the conductor 34 has an outwardly bulged portion 44 and a top portion 34a which is connected to one end of filament 42. The other end of the filament 42 is connected to a top portion 32a of the conductor 32.

The position of the outwardly bulged portion 44 along the conductor 34 is predeterminedly located along the dimension of the inner cylinder 38 so that the bulged portion 44 forces the inner cylinder 38 upward along the inner walls of the inner envelope 36 to locations 56 and 58 of the inner envelope 36. Thusly, the inner cylinder 38 is fixedly positioned within the inner envelope 36 and the filament 42 is preferably coaxially aligned in the inner cylinder 38. Another embodiment of the present invention effective for establishing a fixed position of the inner cylinder 38 and coaxially aligning the filament 42 is shown in FIG. 4.

Figure 4:
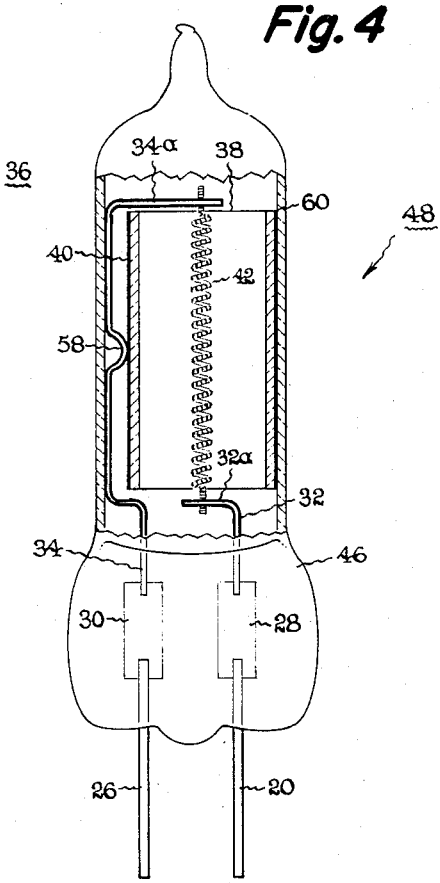
FIG. 4 shows the inner envelope of the incandescent lamps of FIGS. 1 and 2 in accordance with another embodiment thereof.

FIG. 4 is similar to FIG. 3 and uses the same reference numbers to show the elements illustrated in FIG. 3. The primary difference between FIGS. 3 and 4 is that FIG. 4 shows an inner envelope 48 and further shows the conductor 34 positioned outside the inner cylinder. This conductor 34 also is shown as having a U-shaped portion 58 abutting a side of the inner cylinder 38 so as to force the inner cylinder 38 against the inner walls of the envelope 48, as shown at location 60. The coaxial alignment of the filament 42 within the confines of the cylinder 38 for both embodiments of FIGS. 4 and 3 is of substantial importance to the present invention with regard to the performance of an infrared film 40 located on the outer surface of the inner cylinder 38 in a manner hereinafter described. Other means, such as dimpling the inner envelope 36, so as to fix the coaxial alignment of the filament within the inner cylinder 38 are contemplated by the practice of this invention.

Each of the embodiments of the present invention of FIGS. 3 and 4 involves predetermined selection of: (1) the dimensions of the conductor 34 including its inwardly projecting top portion 34a and having either the outward bulged portion 44 of FIG. 3 or the U-shaped portion 58 of FIG. 4, (2) the dimension of the conductor 32 having its inwardly projecting top portion 32a, and (3) the dimensions of the inner diameter of the inner cylinder so that when filament 42 is connected across conductors 34 and 32 it is concentrically or coaxially aligned relative to the centerline of the inner cylinder 38 within a range determined by the radius parameter of an uncoiled filament 42, a coiled filament 42 or a coiled-coil filament 42. Preferably the radial spacing of the filament 42 in the cylinder 38 is within a dimension of no more than about 1.5 times the radius of the filament 42.

For example, for (1) an uncoiled filament 42 having a radius of R for its tungsten wire, (2) a coiled filament 42 having a first coiling radius of R1, and, (3) a coiled-coil filament 42 having a second coiling radius of R2, it is desired that the filament 42 during its connection across conductors 34 and 32 be coaxially aligned relative to the centerline of the inner cylinder 38 within a distance of 1.5 R, 1.5 R1 and 1.5 R2, respectively. Such alignment provides for enhanced performance of film 40 as hereinafter described.

The film 40 may be of a visible light-transmitting, IR reflecting interference film type such as disclosed in U.S. Pat. No. 4,229,066 wherein is described a tantalum pentoixide $Ta_2O_5$ and fused silica $SiO_2$ reflecting filter. The film 40 is placed onto the outer surface of the inner cylinder 38 in a plurality of alternating layers of the tantalum pentoxide $Ta_2O_5$ and silicon dioxide $SiO_2$ materials.

In general, the film 40 performs in such a manner that the practice of this invention contemplates transmission of at least 80% of the visible light out of lamps 10 and 50 and redirection of at least 50% of the infrared radiation centripetally toward the filament 42.

The inner cylinder 38 having the IR film 40 on its outer surface is positioned within the inner envelope 36 so as to surround the tungsten filament 42 in such a manner to enhance the coupling and reflection between the filament 42 and inner cylinder 38. One of the advantages gained from this enhancement is that the film 40 redirects the infrared energy emitted from the filament 42 back toward the filament so as to reduce the necessary power required to maintain a constant filament temperature.

The inner cylinders 38 disposed about the filament 42 provides enhanced coupling and reflection between the filament and cylinder by advantageously utilizing the relationships between the parameters of the geometry of the filament and of the cylinder 38. The relationship between some of these geometric parameters is best described with reference to FIG. 5.

Figure 5:
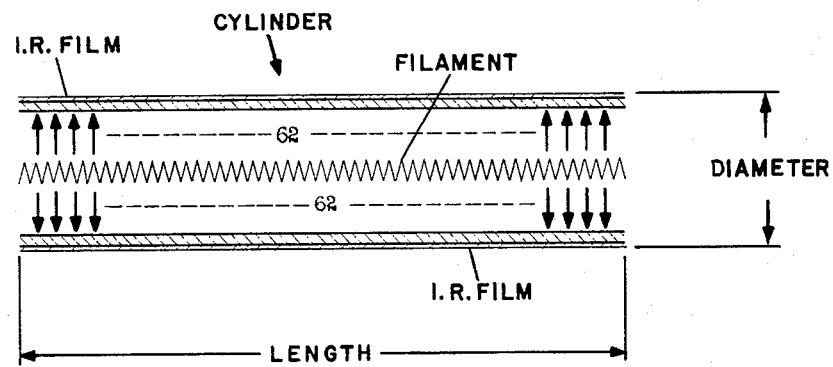
FIG. 5 illustrates schematically some of the parameters related to the present invention.

FIG. 5 shows schematically a CYLINDER having, (1) a LENGTH, and (2) a DIAMETER which is shown in FIG. 5 as that of the outer diameter of the cylinder and includes the thickness of an IR film on the outer surface of the CYLINDER. FIG. 5 further shows a coaxial FILAMENT longitudinally extending along a major portion of the LENGTH of the CYLINDER. Infrared radiation emitted by the FILAMENT is indicated by arrows 62. The ends of the CYLINDER are shown in FIG. 5 as opened and thus carry no IR film.

FIG. 5 illustrates the relationships between the desired geometric parameters of the inner cylindrical member 38 containing an IR film 40 on its outer surface, and an axially located tungsten filament 42. First consider infrared radiation emitted near one end of the filament 42. If this radiation is directed perpendicular to the axis of the filament 42 or if it is directed away from the end of the filament 42 it will be reflected back to the filament 42 and a sizeable portion will be absorbed by the filament 42. However radiation emitted toward the end of the filament 42 even if reflected cannot return to the filament 42 and is thus incapable of enhancing the efficacy of the lamp. This radiation is termed end loss. The amount of end loss radiation can easily be shown to be a monatonically decreasing function of the ratio of cylinder length to diameter as shown by the curve 64 in FIG. 6. Secondly, the ratio of the cylinder diameter to the filament diameter needs to be less than 20 in order to minimize the problems related to filament positioning. The ratio of the cylinder diameter to the filament diameter of 20 to 1 is determined by practical considerations. Theoretically this ratio may be increased indefinitely as the spectral characteristics of the reflector and the positioning of the filament approach an ideal condition. Of the two above considerations the one which is of major importance is the ratio of the length of the cylinder, 38 to the diameter of the cylinder 38. This ratio is related to the efficacy gains realized by the present invention and is best described with reference to FIG. 6.

Figure 6:
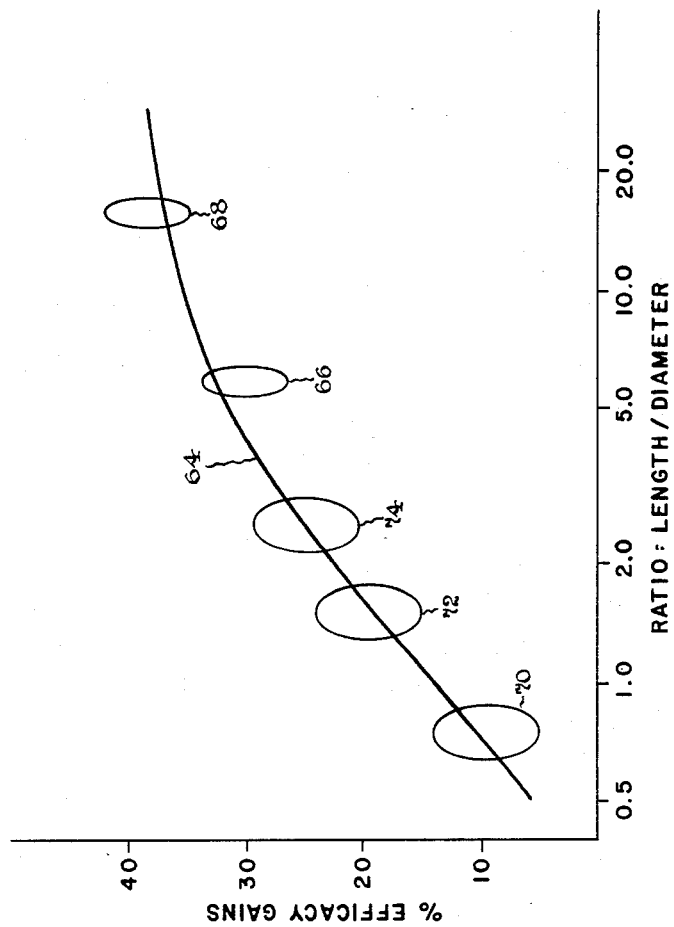
FIG. 6 illustrates the efficacy gains realizable by the present invention.

FIG. 6 shows the ratio of the length to the diameter of the cylinder 38, having the IR film 40, along its x coordinates as the ratio: LENGTH/DIAMETER, whereas, the % EFFICACY GAINS realized by the "RATIO: LENGTH/DIAMETER" is shown along the Y coordinates of FIG. 6. The % efficacy gains of FIG. 6 are for lamps having an equal life typically in the order of 500-2000 hours. As known in the incandescent art, the efficacy or lumens per watt and the life of an incandescent lamp are interdependent functions in which a reduction in the efficacy parameter correspondingly causes an increase in the life parameter of the lamp. The theoretical % efficacy gain of a lamp having equal life typically in the order of 500-2000 hours is shown in FIG. 6 by a curve 64.

From FIG. 6 it is noted that a RATIO of approximately 0.5 corresponds to an efficacy gain of approximately 5%, whereas, a RATIO of approximately 20.0 corresponds to an efficacy gain of approximately 38%.

Still further, from FIG. 6 it is noted that the efficacy plot 64 passes through two ellipsoidal portions 66 and 68. The ellipsoidal portions 66 and 68 are respective representations of the actual achievements realized for this invention for General Electric Company Quartzline Watt-Miser TM 325 watt-120 volt and 900 w-240 v lamps, especially adapted in accordance with the teachings of this invention.

Further still, from FIG. 6 it is noted that efficacy plot 64 passes through ellipsoidal portions 70, 72 and 74. Ellipsoidal portions 70, 72 and 74 do not represent actual test achievements obtained by this invention but do represent the achievements contemplated by this invention. Ellipsoidal portion 70 is representative of the contemplated efficacy gains for a CC-8 type incandescent lamp having a 60 watt rating operated at a voltage of 36 volts. Ellipsoidal portion 72 is representative of the contemplated efficacy gains for an incandescent lamp having a 90 watt rating operated at 120 volts, whereas, ellipsoidal portion 74 is representative of a C-8 type incandescent lamp having a wattage rating of 60 watts operated at a voltage of 36 volts. The CC-8 and C-8 type lamps contemplated by this invention have an inner envelope with a wide range of structural dimensions and wattage ratings having disposed therein a specially adapted low voltage filament which are disclosed in copending U.S. patent application Ser. No. 519,165 and is assigned to the same assignee as the present invention.

Although, the above description was related to the placement of an infrared film 40 on the outside of the inner cylinder 38, it is to be recognized that the infrared film 40 can alternatively be placed on the inside surfaces of the inner cylinder 38. An infrared film 40 placed on the inside of the inner cylinder is subjected to higher temperature, relative to being located outside of the cylinder, but the film 40 is capable of withstanding and operating effectively at the operating temperatures and in the halogen atmospheric environment. The film of the previously mentioned U.S. Pat. No. 4,229,066 is desirable for temperatures of up to and including about 950° to about 1050° C. which are well within the temperature range of the environment of the inner walls of the inner cylinder 38.

Further, although the above description is of an inner cylinder 38 surrounding a major portion of the tungsten filament 42, if desired and with reduced efficacy derived for lamp 10, the inner cylinder need only surround a minor portion of the filament 42. Conversely, if desired a cylinder 38 can be provided having a length dimension which extends beyond the length of filament 42 so as to reduce the end loss mentioned with regard to FIG. 5.

Still further, it should be recognized that the cylindrical shape of the inner cylinder 38 lends itself to facilitating the fabrication process of the incandescent lamps of the present invention. For example, a relatively long inner cylinder 38 may first be used and the desired infrared film 40 placed onto the full length of the cylinder 38 in a one-coating process. The long cylinder may then be cut into multiple shorter segments for individual placement within an inner envelope 36 by the use of the stationary positioning arrangements such as shown in FIGS. 3 and 4.

Further still, although the above description states that as the RATIO:LENGTH/DIAMETER is increased the efficacy of the lamp is correspondingly increased, it is to be recognized that inner cylinders having relatively small diameters have certain advantages and thus are preferred. For example, a small diameter cylinder having the desired IR coating employed with the inner arrangement of FIG. 4 allows movement of the filament off center with respect to the total geometry of lamp 10, while still allowing the filament to be advantageously centered with regard to the film 40. For this arrangement, shown clearly in FIG. 4, the supports for the filament such as conductors 32 and 34 are outside of the path of the infrared reflected radiation. The removal of the support members from the path of the infared reflected radiation provides more freedom for placement of the support members and still affords lamp light emission symmetry.

It should now be appreciated that the present invention provides the incandescent lamp art with general service and PAR incandescent lamps having substantially improved efficacy.

What we claim as new and desire to secure by Letters Patent of the United States is:

1. An improved incandescent lamp comprising:
   an outer envelope having an inner envelope spatially disposed in an axial manner therein;
   said inner envelope having a tungsten filament of predetermined length spatially disposed coaxially therein, said inner envelope containing a halogen gas and a relatively high pressure inert fill gas;
   a light-transmissive cylindrical member of predetermined length and diameter housed within said inner envelope and at least partially surrounding said tungsten filament;
   said cylindrical member having an infrared reflecting film covering one of its surfaces, and effective during energization of said filament to intercept and reflect back toward said filament a major portion of the infrared radiation emitted by the filament;
   and said infrared film being capable of withstanding and operating effectively at the operating temperature and in the halogen atmospheric environment of the film substrate.

2. An improved incandescent lamp according to claim 1 wherein the length and diameter of said cylindrical member are of a ratio in the range of about 0.5 to about 25.

3. An improved incandescent lamp according to claim 1 wherein said filament is coiled, has a predetermined coiling radius, and is axially aligned relative to the centerline of said inner envelope within a range of no more than one and one-half (1.5) times said filament coiling radius.

4. An improved incandescent lamp according to claim 3 wherein said filament has a predetermined coiling diameter, said coiling diameter and the diameter of said cylindrical member are of a ratio of one (1) to twenty (20).

5. An improved incandescent lamp according to claim 1 wherein said length of said coated cylindrical member extends beyond said length of said filament.

* * * * *